（12） United States Patent
Warburton et al.

(10) Patent No.: US 11,067,344 B2
(45) Date of Patent: Jul. 20, 2021

(54) THERMAL ENERGY STORAGE APPARATUS (71) Applicant: Climate Change Technologies Pty Ltd, Wayville (AU)

(72) Inventors: Graham Warburton, Lonsdale (AU); Neil Parkinson, North Brighton (AU)

(73) Assignee: Climate Change Technologies Pty Ltd., Wayville (AU)

( * ) Notice: Subject to any disclaimer, the term of this patent is extended or adjusted under 35 U.S.C. 154(b) by 57 days.

(21) Appl. No.: 16/610,339

(22) PCT Filed: May 3, 2018

(86) PCT No.: PCT/AU2018/050405
§ 371 (c)(1),
(2) Date: Nov. 1, 2019

(87) PCT Pub. No.: WO2018/201193
PCT Pub. Date: Nov. 8, 2018

(65) Prior Publication Data
US 2020/0088473 A1 Mar. 19, 2020

(30) Foreign Application Priority Data

May 3, 2017 (AU) .................. 2017901612

(51) Int. Cl.
*F28D 20/02* (2006.01)
*F02G 1/04* (2006.01)
(52) U.S. Cl.
CPC ............. *F28D 20/023* (2013.01); *F02G 1/04* (2013.01)
(58) Field of Classification Search
CPC .......... F28D 20/023; F28D 2020/0082; F28D 20/00; F28D 2020/0004; F28D 2020/0017;
(Continued)

(56) References Cited

U.S. PATENT DOCUMENTS 3,370,418 A 2/1968 Kelly
3,548,930 A 12/1970 Byrd
(Continued)

FOREIGN PATENT DOCUMENTS

DE 10-2010-04358 A1 6/2011
DE 202011000830 U1 8/2011
(Continued)

OTHER PUBLICATIONS

International Search Report and Written Opinion prepared by the Australian Patent and Trademark Office as International Searching Authority for PCT International Patent Application No. PCT/AU2018/050405, dated Jun. 18, 2018, 11 pages.
(Continued)

*Primary Examiner* — Jianying C Atkisson
*Assistant Examiner* — Jose O Glass-Quinones
(74) *Attorney, Agent, or Firm* — Adsero IP (57) ABSTRACT A thermal energy storage apparatus, including: a block of a heat-absorbing material, the block defining at least one receptacle and being a contiguous block of compressed sintered graphite; and a phase change material stored in the or each receptacle, the phase change material being one that expands as it cools, wherein separation of side walls of the or each receptacle progressively increases as they extend upwardly from the base, whereby as the phase change material solidifies and expands it is urged upwardly to reduce pressure applied to the heat-absorbing material.

19 Claims, 7 Drawing Sheets (58) Field of Classification Search
CPC .......... F28D 20/0056; F28D 2020/006; F28D 20/021; F28D 20/025; F28D 20/028; Y02E 10/46; Y02E 60/14; C09K 5/06; F28F 21/02; F28F 23/00; F28F 27/006; F28F 2255/18; F28F 2265/14
See application file for complete search history.

(56) References Cited

U.S. PATENT DOCUMENTS

| | | | |
|---|---|---|---|
| 4,149,525 A * | 4/1979 | Prado | F24S 10/40 126/654 |
| 4,830,092 A | 5/1989 | Lee | |
| 4,850,424 A * | 7/1989 | Mitani | F28D 20/028 165/10 |
| 5,074,283 A | 12/1991 | Beatty et al. | |
| 5,201,606 A * | 4/1993 | Davis | F28D 20/0043 405/55 |
| 5,217,062 A * | 6/1993 | Lindner | F28F 21/02 165/10 |
| 5,605,190 A * | 2/1997 | Strahle | F28D 20/021 165/10 |
| 5,694,515 A | 12/1997 | Goswami et al. | |
| 7,524,385 B2 | 4/2009 | McGrath | |
| 8,937,385 B2 * | 1/2015 | Ben Jamaa | H05K 7/205 257/714 |
| 9,052,122 B2 * | 6/2015 | Glynn | F24S 20/20 |
| 9,115,937 B2 * | 8/2015 | Perryman | F28D 20/021 |
| 10,113,810 B2 | 10/2018 | Parkinson et al. | |
| 2008/0276616 A1 | 11/2008 | Flynn et al. | |
| 2009/0199998 A1 | 8/2009 | Shimozono | |
| 2010/0212656 A1 | 8/2010 | Qiu et al. | |
| 2011/0120131 A1 | 5/2011 | Ostlund | |
| 2011/0199177 A1 | 8/2011 | Lehto et al. | |
| 2012/0055661 A1 | 3/2012 | Feher | |
| 2012/0227926 A1 * | 9/2012 | Field | F24S 60/10 165/10 |
| 2012/0312292 A1 | 12/2012 | Bahl et al. | |
| 2013/0206356 A1 * | 8/2013 | Pedretti | F28D 20/0056 165/10 |
| 2014/0020385 A1 * | 1/2014 | Petkanchin | F24S 60/30 60/641.15 |
| 2015/0053367 A1 * | 2/2015 | Parkinson | F28F 7/02 165/10 |
| 2015/0337454 A1 * | 11/2015 | Nouri | C30B 11/002 117/223 |
| 2019/0041139 A1 | 2/2019 | Parkinson et al. | |

FOREIGN PATENT DOCUMENTS

| | | |
|---|---|---|
| WO | WO-2011-017767 A1 | 2/2011 |
| WO | WO 2011-058383 A2 | 5/2011 |
| WO | WO-2013-020176 A1 | 2/2013 |
| WO | WO-2018-201193 A1 | 11/2018 |

OTHER PUBLICATIONS

International Preliminary Report on Patentability, Australian Patent and Trademark Office as International Searching Authority for PCT International Patent Application No. PCT/AU2018/050405, dated Nov. 5, 2019, 5 pages.
International Search Report prepared by the Australian Patent Office as International Searching Authority for PCT International Patent Application No. PCT/AU2012/000938, dated Oct. 29, 2012, 6 pages.
Australian Patent Application No. 2012292959, Patent Examiner Report No. 1 dated Dec. 12, 2014; 3 pages.
Australian Patent Application No. 2012292959, Patent Examiner Report No. 1 dated Dec. 10, 2015; 3 pages.
Australian Patent Application No. 2012292959, Notice of Acceptance dated Jan. 30, 2016; 2 pages.
EP12821890.6 European Extended Search Report dated Oct. 26, 2015; 5 pages.
U.S. Appl. No. 16/140,253 Non-Final Office Action, dated Apr. 23, 2020, 83 pages.
Krishnan et al., "Analysis of Solid-Liquid Phase Change Under Pulsed Heating", CTRC Research Publication, Purdue Univ, 8 pages.

* cited by examiner

THERMAL ENERGY STORAGE APPARATUS

CROSS REFERENCE TO RELATED APPLICATIONS

This application is a 35 U.S.C. § 371 national phase application of PCT/AU2018/050405 (WO 2018/201193 A1), filed on May 3, 2018, entitled "Thermal Energy Storage Apparatus," which application claims the priority from Australian Application No. 2017901612, filed May 3, 2017, both of which are incorporated herein by reference in its entirety for all purposes.

FIELD OF THE INVENTION

The present invention relates to a thermal energy storage apparatus.

BACKGROUND OF THE INVENTION

There has been a push in recent years to move away from fossil fuels as an energy source. The move towards what are generally characterised as "renewables" or cleaner fuel sources has seen significant development in the use of solar or wind energy as a means of providing usable forms of energy.

However, consistency of supply and electricity grid stability is a major issue with renewables. For example, by its very nature, solar energy's biggest pitfall is the fact that at certain times of the day, the sun is unable to provide the necessary flux of photons to various devices that utilise solar energy. Similarly, wind-turbines and the like are only effective when there is sufficient wind strength to drive them.

Interrupted or inconsistent supply of energy from a source makes it, in many instances, unreliable and also uneconomical, thereby limiting the potential use of the source.

In addition, at certain times, the sun's rays can be so excessive that the resultant heat and energy are dissipated as over-supply, rather than being usable by a solar-powered device.

A previous attempt to address the above difficulties used a silicon metalloid material as a means of storing thermal energy inside the material for use at a later time, for example, when solar input was no longer available, such as during the evenings or times of inclement weather. During peak solar activity the silicon metalloid material would absorb thermal energy as it underwent a phase change from a solid to a liquid.

Silicon metalloid material is characterised in part by the property that on undergoing a phase change from liquid to solid, there is an expansion of the material rather than contraction as would be expected for most other materials.

The thermal energy stored within the silicon metalloid material could be converted into electrical and/or mechanical action through electrical devices such as a Stirling engine or Turbine and so forth, thus providing a source of power at times when solar activity was not available.

A disadvantage of silicon metalloid material is that it requires significant care and understanding of its physical transformation during its expansion and contraction as it absorbs and releases thermal energy during phase changes. The expansion and contraction of the silicon metalloid material creates significant build-up of pressure on an enclosure in which it is placed. For example, if silicon metalloid material in the form of ingots is placed directly in contact with a refractory heat-absorbing material such as graphite, the metalloid would be absorbed by the graphite on undergoing a phase change to its liquid form. If the silicon metalloid is stored in a separate enclosure before being inserted into the refractory material, the continual pressure build-up and collapse of the silicon metalloid ingots as they undergo phase changes can result in fissuring of the enclosure.

If the ingots are stored within separate enclosures there would also be a need for the enclosure of the silicon metalloid ingots to efficiently transport heat, released during phase change of the silicon metalloid material, to the surrounding graphite.

International Patent Application no. PCT/AU2010/001035 (published as WO 2011/017767) sought to address these problems by providing an enclosure in the form of an elongate canister formed of ceramics, the elongate canister including a pressure dispersion punt in its base to disperse and control expansion, and a series of grooves in one of its ends, the series of grooves acting as a heat sink. In the thermal energy storage apparatus described in PCT/AU2010/001035, a series of such canisters are used to store silicon metalloid, and are packed in interleaved arrangement with a series of sintered graphite rods. It has been found, though, that in such an arrangement the canisters are prone to cracking, particularly in the region of the grooves.

Also, the thermal energy storage apparatus described in PCT/AU2010/001035 suffers from performance issues due to poor heat transfer from the heat absorbing material into the phase change material. This particularly arises due to the graphite heat absorption material being in the form of bundled rods.

This problem is addressed in International Patent Application no. PCT/AU2012/000938 (published as WO2013/020176), also to the present applicant. The entire contents of this disclosure are incorporated by reference herein. In this regard, it was recognised that by providing a block of heat-absorbing material in the form of a contiguous block of compressed material in the form of sintered graphite which is machinable, greater heat transfer from the block to the heat storage elements can be achieved. Although the performance of the thermal energy storage apparatus is greatly increased, containment tubes are still used, thereby reducing the efficiency of the apparatus, and cracking of the heat absorbing material can still be a problem. It is desirable to remove the containment tubes, though this leaves the block prone to cracking.

It would be desirable to overcome or alleviate the above mentioned difficulties, or at least provide a useful alternative.

SUMMARY OF THE INVENTION

According to the present invention there is provided a thermal energy storage apparatus, including:

a block of a heat-absorbing material, the block defining at least one receptacle and being a contiguous block of compressed sintered graphite; and a phase change material stored in the or each receptacle, the phase change material being one that expands as it cools, wherein separation of side walls of the or each receptacle progressively increases as they extend upwardly from the base, whereby as the phase change material solidifies and expands it is urged upwardly to reduce pressure applied to the heat-absorbing material.

According to a preferred embodiment of the present invention, the side walls are formed with a progressively decreasing wall angle as they extend upwardly from the base. Preferably, the side walls are separated into discrete sections having a constant wall angle. More preferably, the discrete sections are separated by a groove formed in the block, the groove extending around a surface of the receptacle.

In preferred embodiments, a base of the receptacle is rectangular.

The thermal energy storage apparatus can further include one or more heating elements in thermal contact with the heat absorbing material. Preferably, the one or more heating elements extend alongside an outer surface of the block. Preferably, the heating elements are electric heating elements and formed of graphite.

The thermal energy storage apparatus can further include means for extracting heat from the heat storage elements. The means for extracting heat is preferably a closed-cycle heat engine or turbomachine coupled to the heat storage apparatus. The closed-cycle heat engine can be a Stirling engine coupled to the heat storage apparatus via a wick.

According to a preferred embodiment, the phase change material includes silicon metalloid or a eutectic, hypereutectic or hypoeutectic silicon composition. Preferably, the phase change material is formed as an ingot.

The block of heat-absorbing material can be injected with a highly crystalline petroleum coke.

The receptacle is preferably disposed within a housing that is substantially evacuated or filled with nitrogen.

According to the invention there is also provided a method of storing thermal energy, including the steps of providing a thermal energy storage apparatus of the above described type and providing thermal energy to the phase change material.

Preferably, a receptacle of the thermal energy storage apparatus is disposed in an oxygen free environment.

According to the invention there is also provided a thermal energy storage system, including a plurality of apparatuses of the above described type.

The apparatuses are preferably in communication with a plurality of closed-cycle heat engines or turbines.

BRIEF DESCRIPTION OF THE DRAWINGS

Preferred embodiments of the invention will now be described, by way of non-limiting example only, with reference to the accompanying drawings in which.

DETAILED DESCRIPTION OF PREFERRED EMBODIMENTS

Figure 1:
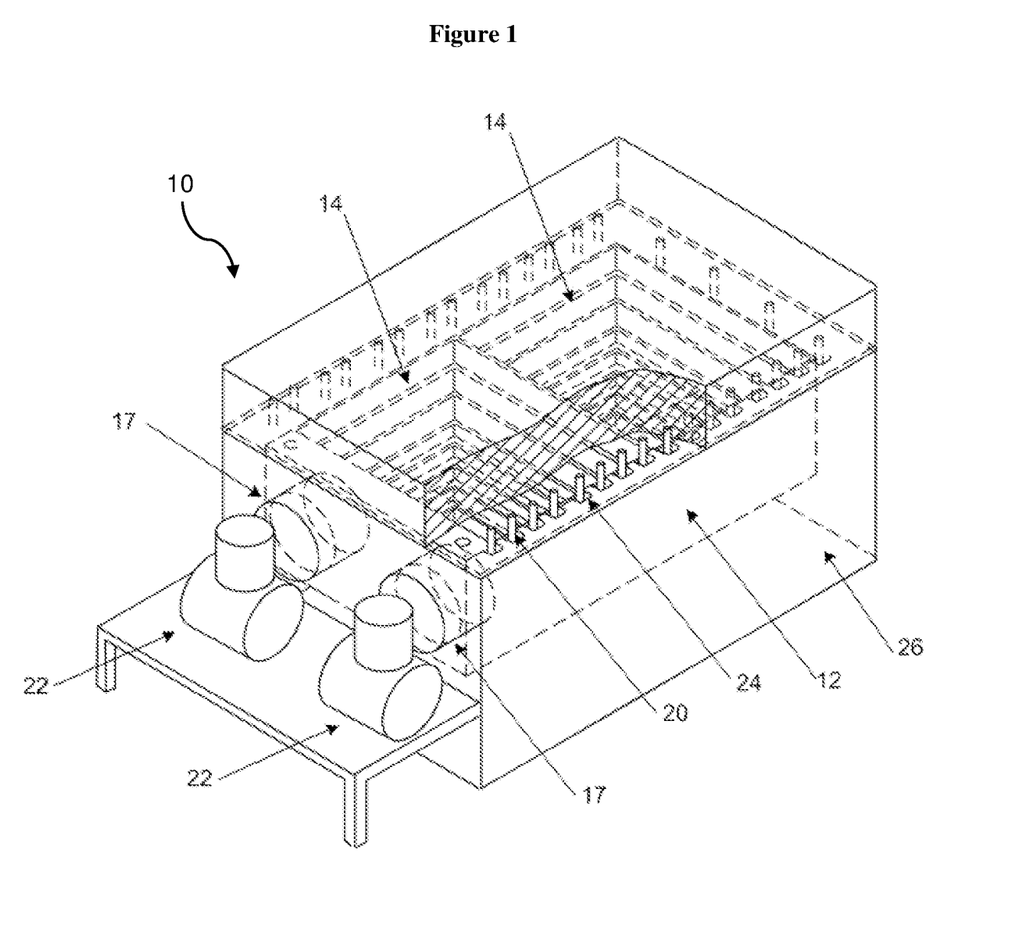
FIG. 1 shows a thermal energy storage apparatus according to one embodiment of the present invention.
Figure 2:
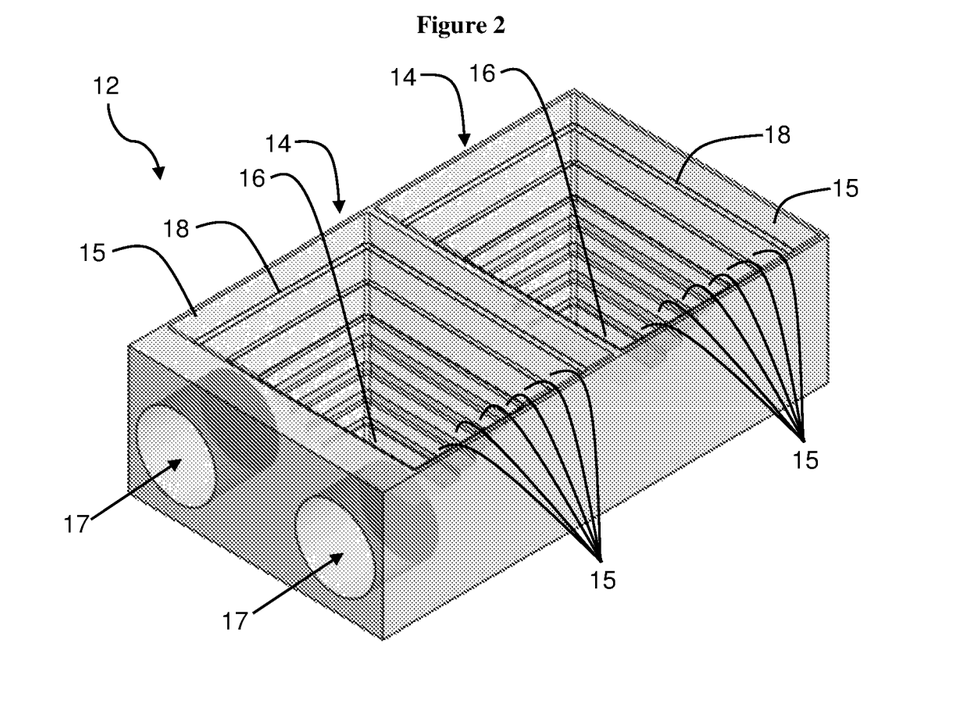
FIGS. 2 to 5 are respective perspective, plan, side and end views of a block of heat absorbing material for use with the thermal energy storage apparatus.
Figure 3:
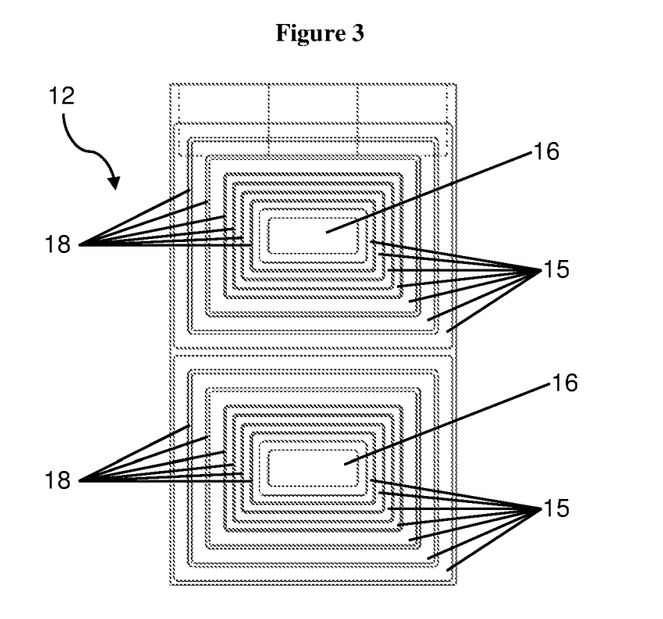

Referring initially to FIG. 1, there is shown a thermal energy storage apparatus 10 according to a preferred embodiment of the present invention.

Figure 10:
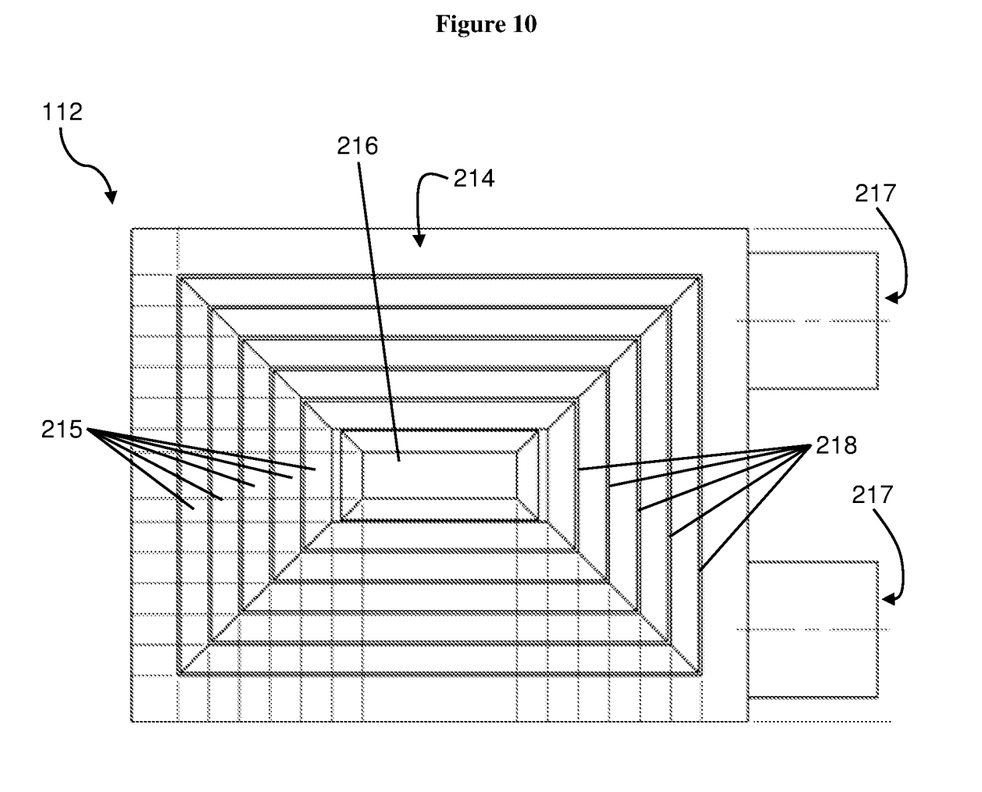
FIGS. 10 to 12 are respective plan, side and end views of another block of heat absorbing material.
Figure 11:
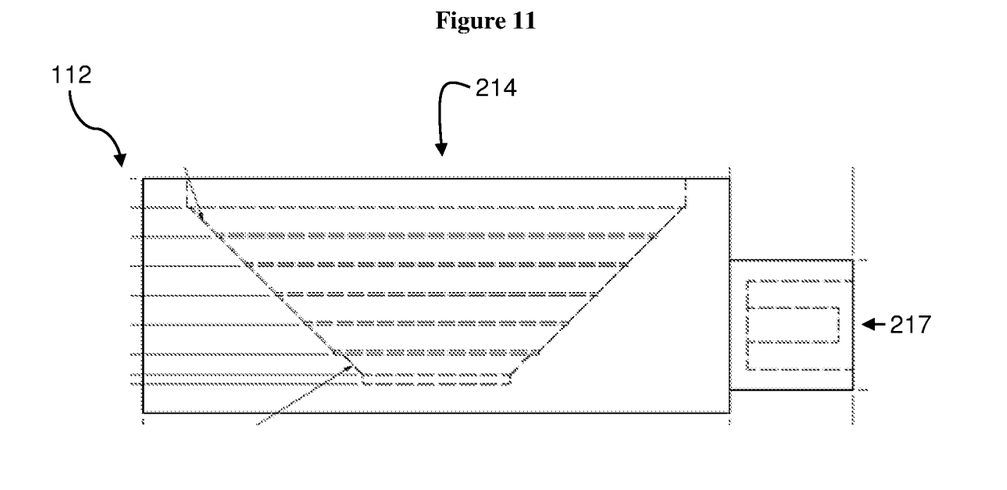
Figure 12:
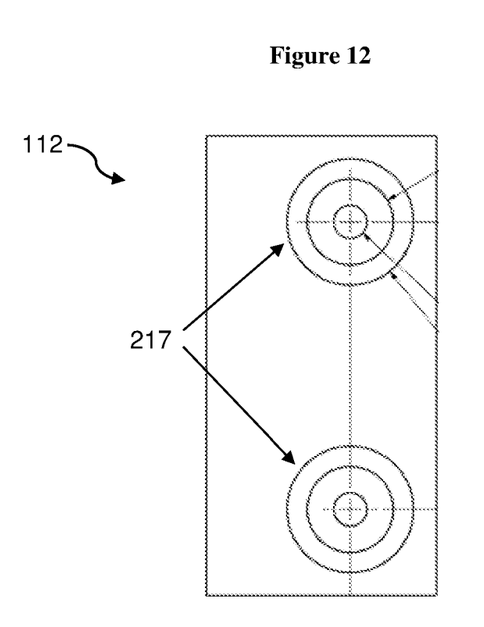

The thermal energy storage apparatus 10 includes a block 12 of a heat-absorbing material. As illustrated in FIGS. 2 to 5, the block 12 defines at least one receptacle 14 in which phase change material can be received. In this regard, the block 12 may be formed with a single receptacle as illustrated in FIGS. 10 to 12, twin receptacles as illustrated in FIGS. 2 to 9, or greater than two receptacles. The block 12 is a contiguous block of compressed sintered graphite which is machinable.

As used herein, the term "contiguous" refers to a single mass of material, whether solid or porous, in which any two points within the mass may be joined by a continuous path. By being "contiguous" the block is a single or unitary piece of heat absorbing material. The block is not composed of an assemblage of multiple, discrete pieces of heat absorbing material.

By the block defining at least one "receptacle" is meant that the block is shaped to have at least one cavity that can receive the phase change material. For example, a receptacle may be formed in the block of compressed sintered graphite by a material removal process in which graphite is removed to form a cavity in the block. This may be achieved, for example, by machining the block.

A phase change material which expands on cooling, in this case silicon metalloid, is stored within the receptacles 14. As illustrated in FIGS. 2 to 12, side walls of the receptacles 14 are formed with a progressively decreasing wall angle as they extend upwardly from a base 16 of the receptacle. In this regard, portions of the wall that are closer to the base 16 are at or near to vertical, with the wall angle decreasing closer to horizontal as the wall extends away from the base. Although a lowermost portion of the walls may be vertical, the height of any such portions would be minimized.

The described configuration of the walls of the receptacles 14 provides that as the phase change material cools and expands it is urged upwardly to disperse pressure and reduce the amount of pressure applied to the block 12, thereby reducing cracking or fissuring of the block 12 over thermal cycling.

By the phase change material being "urged upwardly" is meant that as the phase change material solidifies it expands towards the mouth of the receptacle as a result of the counter pressure offered by the surface of the receptacle. In other words, the present invention provides a block of a heat-absorbing material, the block (i) defining at least one receptacle having a mouth and a base, and (ii) being a contiguous block of compressed sintered graphite; and a phase change material stored in the or each receptacle, the phase change material being one that expands as it cools, wherein separation of side walls of the or each receptacle progressively increases as they extend upwardly from the base to the mouth of the receptacle, whereby as the phase change material solidifies it expands towards the mouth of the receptacle to reduce pressure applied to the heat-absorbing material.

In some embodiments, the side walls of the receptacle 14 are separated into discrete sections 15. Provided the horizontal cross-section of the receptacle increases along an upward direction, there is no particular limitation to the specific design of the sections 15.

In some embodiments, a vertical cross-section of the receptacle has a step-wise profile. In such embodiments, a side wall of the receptacle is such that each section 15 has a vertical wall alternating with a horizontal step to provide a step-like profile. The step-wise change in wall profile is such that the separation distance between the side walls of receptacle increases from its base towards its top.

In other embodiments, a vertical cross-section of the receptacle has an angular profile. In such embodiments, a side wall is such that each section 15 is inclined at an angle relative to the vertical direction. The sections can each have a constant angle in which case, the side wall can be at a constant angle (as in FIGS. 10 and 11). Alternatively, the angle of one or more the sections 15 can vary as they extend from the base of the receptacle, for example, the incline of sections 15 in the upper part of the side wall can decrease as the sections extend away from the base, i.e. a lower most section can be more vertical than an uppermost section. In all cases, the distance between side walls increase as they extend away from the base.

Figure 4:
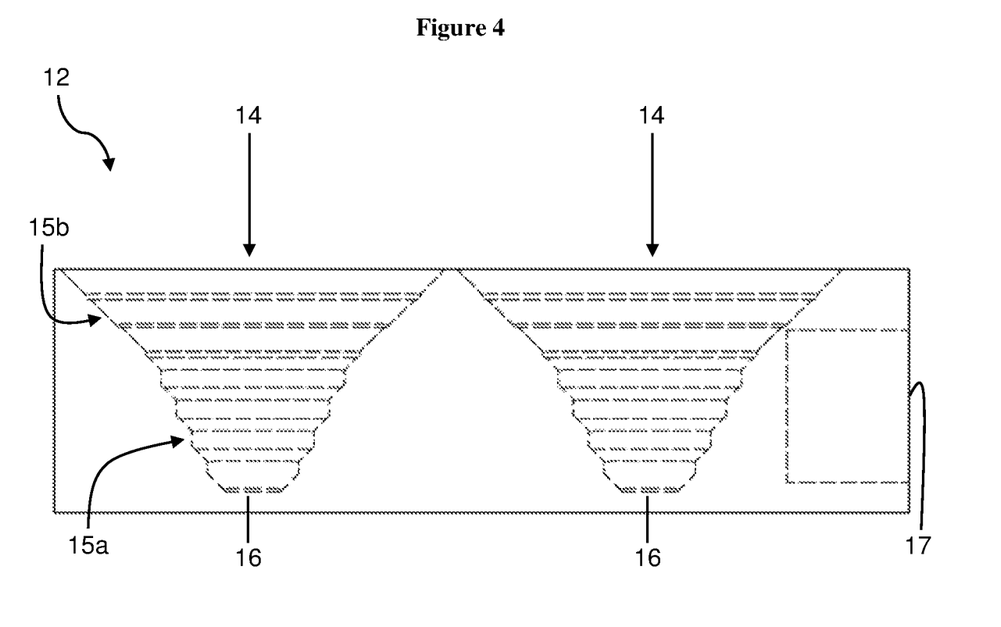
Figure 5:
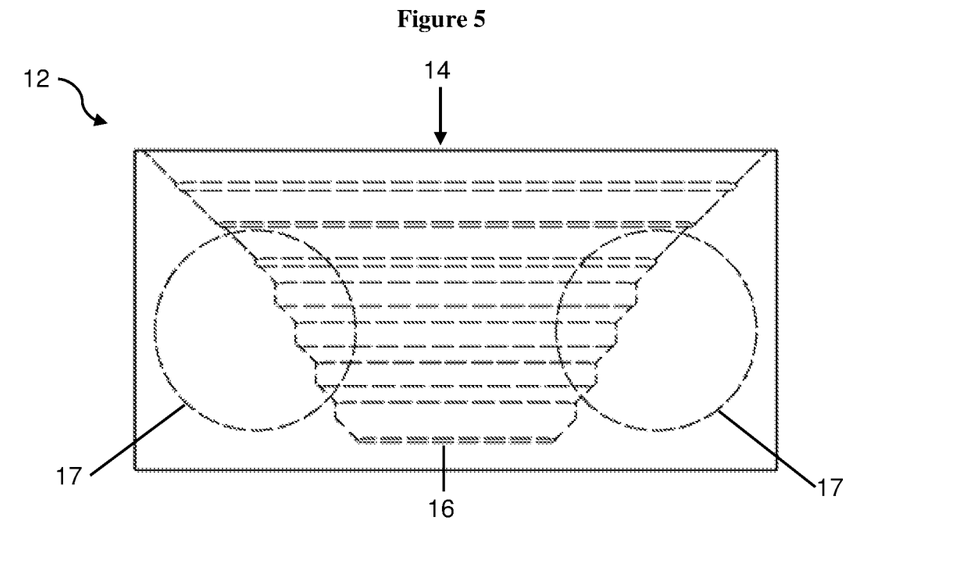
Figure 6:
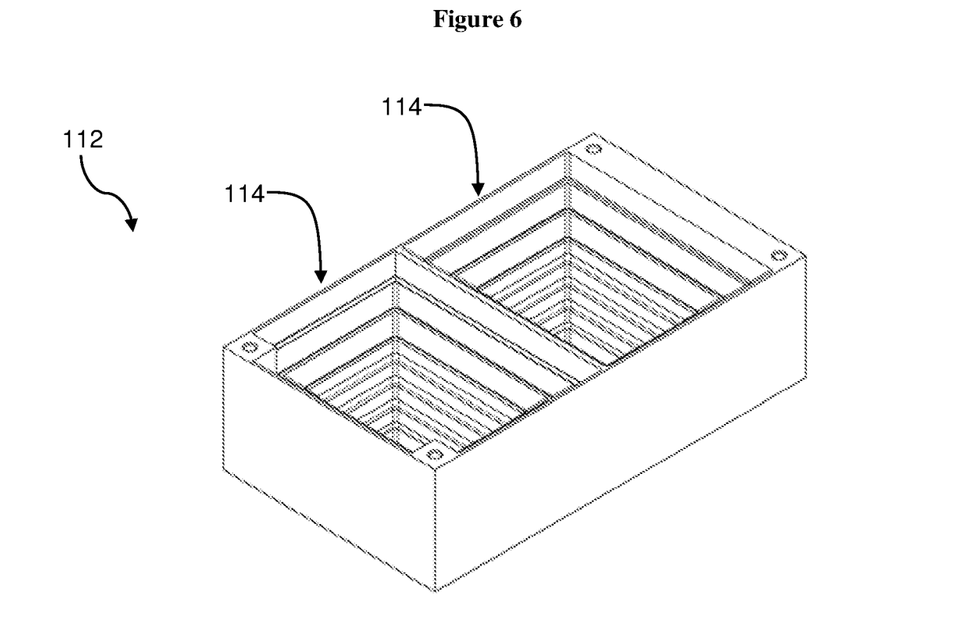
FIGS. 6 to 9 are respective perspective, plan, side and end views of another block of heat absorbing material.
Figure 7:
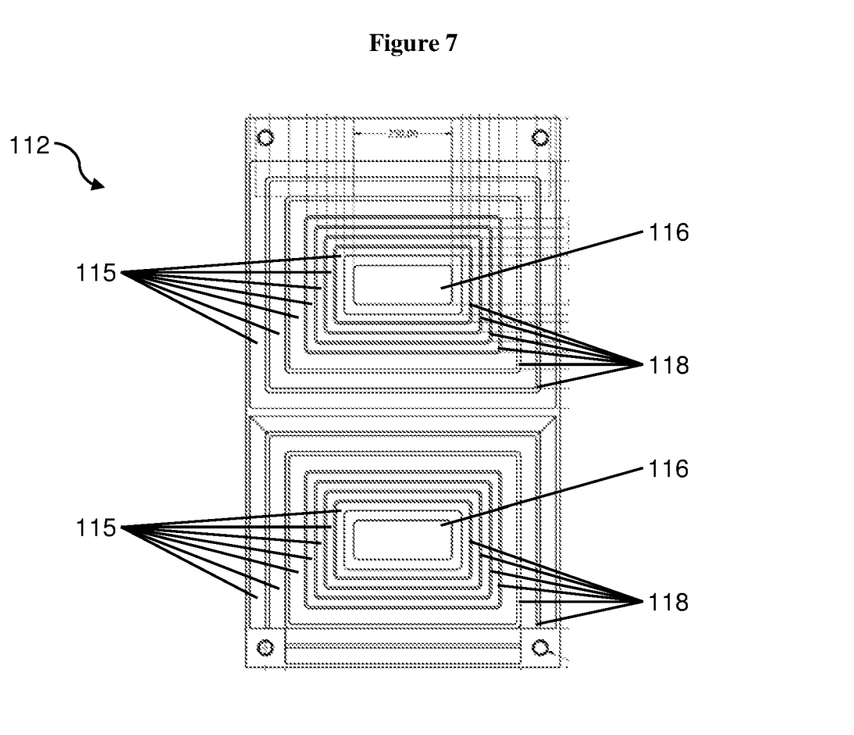
Figure 8:
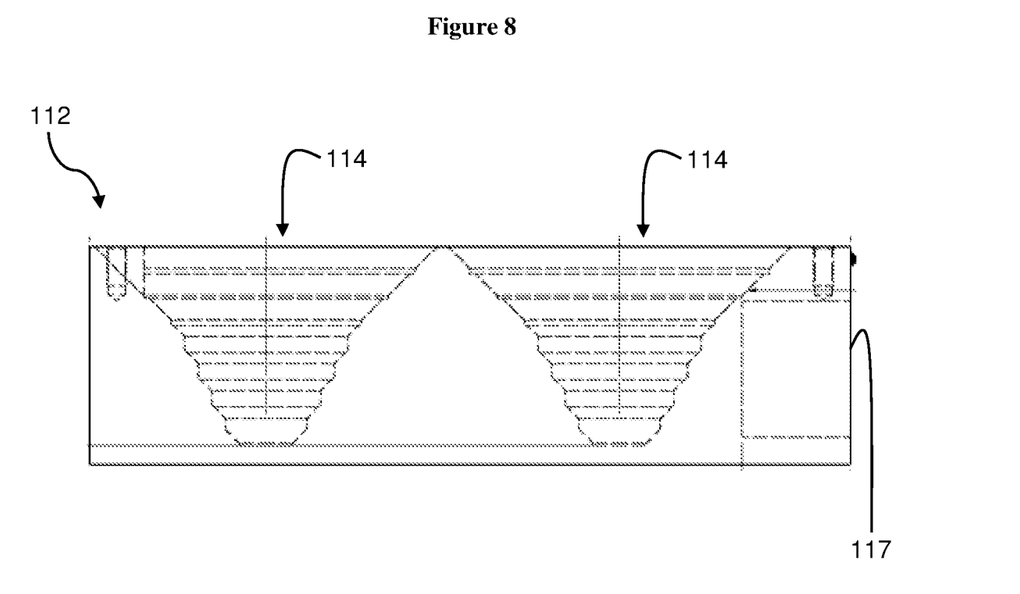
Figure 9:
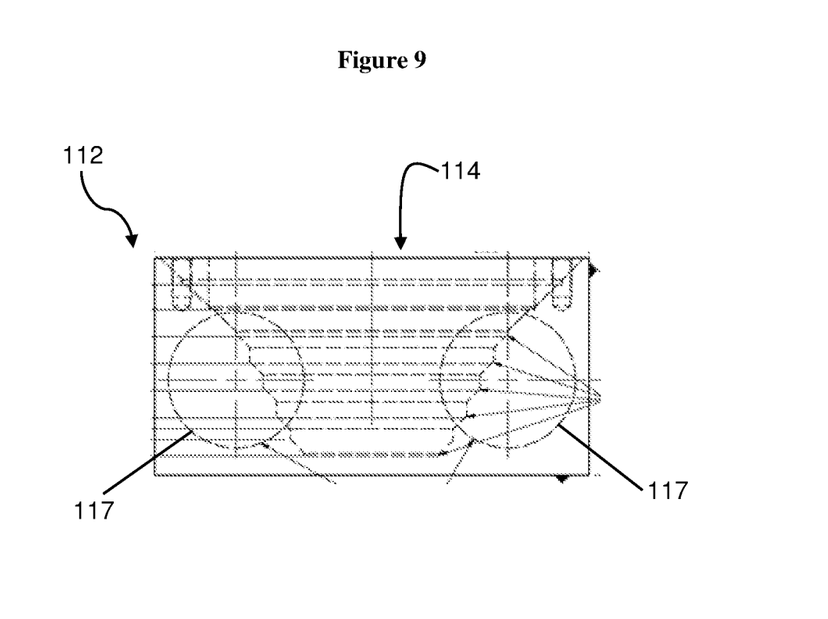

In other embodiments, a vertical cross-section of a side wall the receptacle can have a combination of a step-wise and angular profile. For instance, as shown in FIG. 4, lower sections 15a of the side wall of the receptacle can be step-like, while upper sections 15b of the side wall can have an angular profile.

In other embodiments, the sections 15 may have a curved face. A discrete section 15 can be separated from the section adjacent to it by a groove 18 formed in the block. Preferably, the discrete sections are each separated by a groove 18 formed in the block, the groove 18 extending around a surface of the receptacle 14. Groove 18 further allows pressure dispersement of the expanding phase change material by providing a relief into which the material can flow under pressure.

In alternative embodiments, grooves 18 may be omitted. Also, the side walls may be curved to provide a progressively decreasing wall angle.

In the illustrated embodiment, a base 16 of the receptacle is rectangular and forms a trough. It will be appreciated that the base may take the shape of other polygons, preferably regular polygons, or be circular, though it has been found that a rectangular shape is most desirable and allows the amount of graphite used in the block 12 to be minimised while maximising the amount of phase change material that can be contained in the receptacle 14, thereby increasing the efficiency of the apparatus without rendering the block prone to damage. Also, a rectangular base renders the receptacle mechanically stronger than, for example, an angled base (i.e. as in a receptacle having a vertical cross-section shaped as a "V"). This advantageously ensures that the block 12 can better withstand the lateral pressure generated during solidification of the phase change material.

FIGS. 6 to 9 and 10 to 12 illustrate alternative blocks 112, 212 that take slightly different shapes and show that variations are possible within the scope of the present disclosure.

In particular, block 112 of FIGS. 6 to 9 has a slightly wider base 116 to accommodate more phase change material and the separation of the sections 115 of the side walls are staggered and progressively increase as they extend upwardly from the base.

On the other hand, FIGS. 10 to 12 show a block 212 having a single receptacle 214 in which sections 215, which define the surface of the receptacle and are separated by grooves 218, have constant wall angle.

During cooling, an area of an upper surface of the phase change material forms a dome. This is a result of the portion of the phase change material in contact with the block 12 cooling first, leaving a central portion of the phase change material in a liquid state and capable of being moved upwardly as the phase change material cools.

Regarding the phase change material, silicon metalloid has a latent heat storage capacity of approximately 497 W/kg at a temperature of 1410° C. In some circumstances it may be advantageous to employ, instead of silicon metalloid, a eutectic (or hypoeutectic or hypereutectic) silicon composition, which has a lower heat capacity but also a lower phase transition temperature. For example, a eutectic Al—Si alloy having an Al:Si ratio of 1:12 has a much lower transition temperature of 580° C., whilst still having a relatively large storage capacity of approximately 200 W/kg.

The phase change material of the thermal energy storage apparatus can be in a suitable form. In one embodiment, the phase change material can be in the form of an ingot.

The heat-absorbing material is a contiguous block 12 of compressed sintered graphite, which is machinable. By the sintered graphite being "compressed" is meant that the sintered graphite is compressed into shape. The resulting compressed sintered graphite can then be machined to provide, for example, the receptacles and other shape features depending on the intended use. As a result of being compressed, compressed sintered graphite is denser than sintered graphite. By providing a contiguous block 12 of compressed sintered graphite, many advantages can be obtained. Firstly, liquid silicon is not absorbed by the compressed sintered graphite, thereby allowing containment tubes to be omitted. Also, when a contiguous block of graphite is made and is compressed, a "charged" block is obtained. In a charged block of compressed sintered graphite atoms align in the direction of a current applied thereto, therefore allowing increased heat transfer and thereby increasing the efficiency of the apparatus.

Block 12 may also include a binder or have other material impregnated therein and/or be coated. In a preferred form, the block 12 is impregnated with a highly crystalline petroleum coke, such as needle or acicular coke. This provides increased heat transfer rate across the block 12. In a preferred form, the block 12 is also coated with a coating to protect it from oxidisation. In one example, the coating may be a silicon carbide slurry.

Manufacturing of the block 12, in particular formation of the receptacles, is performed by machining a raw block of compressed sintered graphite. In other forms, the block 12 may also be moulded or cast in a mould and compressed while moulding. Ends of the block may also be machined to accept an end of a Stirling engine, as described further below, or in other forms the block may be machined to allow connection to a turbomachine. While sintered graphite is used in the presently described embodiments, there is also disclosed that other heat-absorbing materials may be suitable, provided they have suitably high thermal conductivity and can be machined into a shape to accommodate the phase-change material and its expansion upon solidification.

In operation of the thermal energy storage apparatus 10, electric current is supplied to the electric heating elements 20 by an external energy source. For example, the current may be a DC current from a photovoltaic array or an AC current from a wind turbine. As current passes through the heating elements 20, resistive heating of the surrounding graphite results. Electric heating elements 20 are provided in close proximity to and around the block 12 and are in thermal contact with the block 12. By the electric heating elements 20 being "in thermal contact" with the block 12 is meant any arrangement that allows for heat transfer between the electric heating elements 20 and the block 12. Preferably, the block 12 is provided within an enclosure 26 of the apparatus 10, and the heating elements 20 are disposed in slots 24 formed in insulation inside the enclosure 26. The enclosure 26 can be formed of any suitable material. For example, the enclosure 26 may be made of mild steel.

In some forms, the electric heating elements 20 are disposed only along long edges of the block 12 so that ends of the block 12, which is where the Sterling engine is positioned, are slightly cooler to encourage flow of heat toward the engine. Advantageously, heat can flow along the block, thereby allowing simultaneous charging and discharging, i.e. storage of heat from the heating elements and extraction of heat via the Sterling engine.

Heat is then transported to the phase change material of the heat storage apparatus via block 12. The silicon metalloid (or eutectic silicon composition, for example) absorbs sensible heat until its temperature reaches melting temperature, at which point further heat input to the silicon metalloid is stored as latent heat of fusion. When the external energy source (solar or wind) is no longer available, or drops below the level required to maintain the core temperature of the phase change material above the melting temperature, the silicon metalloid solidifies. The stored heat is then released to the surrounding graphite.

The heating elements 20 are preferably formed of graphite, and may be coupled to a current source in conventional fashion, for example by copper cabling. In a preferred embodiment, the heating elements 20 are formed of compressed sintered graphite, providing for efficient heating. In alternative embodiments, the heating elements 20 are made of an iron-chromium-aluminium alloy (FeCrAl), for example Kanthal.

Alternatively, the block 12 can be heated directly by solar energy, for example by providing one or more solar concentrators to focus sunlight onto the block 12 at one or more locations, or via hot gases exhausted from a turbomachine. Providing electric heating elements 20 at predetermined locations affords greater control over heating of the block 12, and allows it to be used in conjunction with electricity generation systems, particularly renewable electricity generation systems that have unused electrical energy that can be sent back to the elements to top up their storage instead of being grounded.

In order to extract heat to perform mechanical and/or electrical work, the apparatus 10 can be coupled to a Carnot cycle heat engine, such as a Stirling engine or a Brayton engine, or to turbine machinery. In the illustrated example, two Stirling engines 22 are coupled to the block 12 of the energy storage apparatus 10, such that an end of each Stirling engine can receive heat through apertures 17 which are formed in the block 12. When the phase-change material (located within the receptacles) stores heat, a temperature gradient forms between the core of the phase change material (hot side) and the Stirling engine (cold side), resulting in heat being transferred from the phase change material to each Stirling engine through the block 12 of compressed sintered graphite.

Preferably, as shown in the embodiment of FIG. 1, the apertures 17 are formed in the end of the block 12 that do not comprise heating elements 20, that side being cooler than the side where the heating elements 20 are located. In this arrangement the temperature gradient between the core of the phase change material (hot side) and the Stirling engines 22 (cold side) is increased, thereby improving the efficiency at which heat travels from the phase change material to the engines 22 through the block 12 of compressed sintered graphite. When the core of the phase-change material is at a higher temperature than the head of the heat engine, heat is transported from the phase-change material by thermal conduction. In alternative embodiments, a wick may be provided for connection of the engine to the block 12. In some embodiments, the apparatus 10 is in communication with a plurality of closed-cycle heat engines.

Different areas of the block 12 may heat at different rates and can each have one or more temperature sensors associated therewith. Temperature readings from each sensor may be communicated to a control system (not shown), and the readings used by the control system to adjust the electric current flowing to the heating elements 20, and thus the degree of heating of the block.

The apparatus is disposed within a housing, which is preferably formed of mild steel, the block is sandwiched between upper, lower and side layers of an insulating material. The layers may employ different insulating materials depending on the operating temperatures experienced by the top and bottom of the apparatus 10.

In some embodiments, the apparatus is disposed within a housing that is substantially evacuated or filled with nitrogen. These arrangements advantageously provide improved thermal insulation for optimised heat transfer between the phase-change material and the Carnot cycle heat engine or turbine machinery coupled to the apparatus.

In some embodiments, the apparatus is disposed in an oxygen free environment. This advantageously minimises oxidation of the heat absorbing material forming the receptacle to preserve its heat transfer characteristics.

A further aspect of the invention relates to a method of storing thermal energy, including the steps of (i) providing a thermal energy storage apparatus of the kind described herein, and (ii) providing thermal energy to the phase change material. The provision of thermal energy to the phase change material may be achieved by any means described herein.

A plurality of apparatuses of the above described type may be used to form a thermal energy storage system to provide scalable storage as required. In one form, the apparatuses are arranged side by side and are preferably enclosed to trap excess heat. In another form, the apparatuses are arranged in a hole formed in the ground, the hole being lined with concrete around sides thereof.

Many modifications of the above embodiments will be apparent to those skilled in the art without departing from the scope of the present invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A thermal energy storage apparatus, including:
   a block of a heat-absorbing material, the block defining at least one receptacle and being a contiguous block of compressed sintered graphite; and
   a phase change material stored in the or each receptacle, the phase change material being one that expands as it cools,
   wherein separation of side walls of the or each receptacle progressively increases as the side walls extend upwardly from a base of the or each receptacle, whereby as the phase change material solidifies and expands it is urged upwardly to reduce pressure applied to the heat-absorbing material, and wherein the side walls are formed with a progressively decreasing wall angle as the side walls extend upwardly from the base.

2. The thermal energy storage apparatus according to claim 1, wherein the side walls are separated into discrete sections having a constant wall angle.

3. The thermal energy storage apparatus according to claim 2, wherein the discrete sections are separated by a groove formed in the block, the groove extending around a surface of the or each receptacle.

4. The thermal energy storage apparatus according to claim 1, wherein the base of the or each receptacle is rectangular.

5. The thermal energy storage apparatus according to claim 1, further including one or more heating elements in thermal contact with the heat absorbing material.

6. The thermal energy storage apparatus according to claim 5, wherein the one or more heating elements extend alongside an outer surface of the block.

7. The thermal energy storage apparatus according to claim 5, wherein the one or more heating elements are electric heating element.

8. The thermal energy storage apparatus according to claim 5, wherein the one or more heating elements are formed of graphite.

9. The thermal energy storage apparatus according to claim 1 further including means for extracting heat from the block.

10. The thermal energy storage apparatus according to claim 9, wherein the means for extracting heat is at least one closed-cycle heat engine or turbomachine coupled to the block.

11. The thermal energy storage apparatus according to claim 10, wherein the at least one closed-cycle heat engine is a Stirling engine and an end of the Stirling engine is received in an aperture formed in the block.

12. The thermal energy storage apparatus according to claim 1, wherein the phase change material includes silicon metalloid or a eutectic, hypereutectic or hypoeutectic silicon composition.

13. The thermal energy storage apparatus according to claim 1, wherein the phase change material is formed as an ingot.

14. The thermal energy storage apparatus according to claim 1, wherein the block of heat-absorbing material is injected with a highly crystalline petroleum coke.

15. The thermal energy storage apparatus according to claim 1, wherein the or each receptacle is disposed within a housing that is substantially evacuated or filled with nitrogen.

16. A method of storing thermal energy, including the steps of:
    providing a thermal energy storage apparatus according to claim 1; and
    providing thermal energy to the phase change material.

17. The method according to claim 16, wherein the or each receptacle is disposed in an oxygen free environment.

18. A thermal energy storage system, including a plurality of apparatuses according to claim 1.

19. The thermal energy storage system according to claim 18, the apparatuses being in communication with a plurality of closed-cycle heat engines.

* * * * *